United States Patent
Henson

(10) Patent No.: US 10,064,328 B2
(45) Date of Patent: Sep. 4, 2018

(54) GRASS MOWING MACHINE FOR HIGH POWER APPLICATIONS

(71) Applicant: Deere & Company, Moline, IL (US)

(72) Inventor: Robert A. Henson, Apex, NC (US)

(73) Assignee: DEERE & COMPANY, Moline, IL (US)

( * ) Notice: Subject to any disclaimer, the term of this patent is extended or adjusted under 35 U.S.C. 154(b) by 107 days.

(21) Appl. No.: 15/233,221

(22) Filed: Aug. 10, 2016

(65) Prior Publication Data

US 2018/0042173 A1    Feb. 15, 2018

(51) Int. Cl.

| A01D 34/00 | (2006.01) |
|---|---|
| A01D 34/58 | (2006.01) |
| A01D 69/02 | (2006.01) |
| A01D 34/44 | (2006.01) |
| A01D 42/00 | (2006.01) |
| B60R 16/03 | (2006.01) |
| A01D 101/00 | (2006.01) |

(52) U.S. Cl.
CPC ........... *A01D 34/008* (2013.01); *A01D 34/44* (2013.01); *A01D 34/58* (2013.01); *A01D 42/00* (2013.01); *A01D 69/02* (2013.01); *B60R 16/03* (2013.01); *A01D 2101/00* (2013.01); *B60L 2200/40* (2013.01)

(58) Field of Classification Search
CPC .... A01D 34/006; A01D 34/008; A01D 34/58; A01D 34/78; A01D 69/02; A01D 69/025; B60L 2200/40

See application file for complete search history.

(56) References Cited

U.S. PATENT DOCUMENTS

| 2,509,993 | A | 5/1950 | Soss |
| 5,497,604 | A | 3/1996 | Lonn |
| 5,934,051 | A | 8/1999 | Hahn |
| 6,591,593 | B1 | 7/2003 | Brandont et al. |
| 6,647,703 | B2 | 11/2003 | Oliver |
| 6,945,021 | B2 | 9/2005 | Michel |
| 7,631,478 | B2 | 12/2009 | Henson et al. |
| 7,797,915 | B1 * | 9/2010 | Kallara ............... A01D 75/187 318/54 |
| 8,130,478 | B2 | 3/2012 | Godbold et al. |
| 8,839,598 | B2 | 9/2014 | Shida et al. |
| 9,084,391 | B2 | 7/2015 | Shida et al. |
| 9,113,596 | B2 | 8/2015 | Bricko et al. |
| 2006/0021315 | A1 * | 2/2006 | Brandon ............... A01D 34/74 56/14.7 |
| 2008/0196372 | A1 | 8/2008 | Wilson et al. |
| 2014/0250849 | A1 * | 9/2014 | Ritter .................. A01D 75/182 56/10.2 R |

* cited by examiner

*Primary Examiner* — Alicia M Torres

(57) ABSTRACT

A grass mowing machine for high power applications includes a controller monitoring a total implement load of multiple implements connected to lift arms on a grass mowing machine. The controller determines if the total implement load consistently exceeds available power. If the total implement load consistently exceeds available power, the controller disables at least one but not all of the implements, and provides a signal to at least one but not all of the lift arms to raise the implements.

7 Claims, 3 Drawing Sheets

GRASS MOWING MACHINE FOR HIGH POWER APPLICATIONS

FIELD OF THE INVENTION

This invention relates to grass mowing machines used for other applications such as verticutting or scalping.

BACKGROUND OF THE INVENTION

Golf courses perform applications such as verticutting or scalping once a year for a limited time. Golf courses may prefer to use grass mowing machines with multiple implements, such as fairway mowers, for verticutting or scalping. The power required to run these applications exceeds what is required for mowing. As a result, grass mowing machines like fairway mowers may have engines and implement drives that are sized to satisfy the high power requirements of verticutting or scalping with all the implements engaged.

For example, electric power for the implements may be supplied by an alternator or generator driven directly by an internal combustion engine, or by an energy storage device or fuel cell charged by an alternator. Electric motors for the implements may include brush-less permanent magnet motors, commutated electric motors, or other electric motors. The typical electrical load for each cutting reel used for normal mowing of golf course fairways may be about 0.5 kW, at 1800 rpm and a ground speed of 8 mph. For verticutting or scalping, the typical electrical load for each implement may be about 2.5 kW, at 1400 rpm and a ground speed of 4 mph or less. For heavy mowing, the typical electrical load for each cutting unit may be 1.25 kW, at 1800 rpm and a ground speed of 6 mph.

A grass mowing machine with multiple implements is needed that may be used for high power applications such as verticutting or scalping, but with a smaller and less costly engine and implement drives. A grass mowing machine with multiple implements is needed that can perform high power applications without exceeding available power.

SUMMARY OF THE INVENTION

A grass mowing machine for high power applications includes a controller that senses the total electrical load of multiple implements during high power applications such as verticutting or scalping, and raises and shuts off electrical power to one or more implements if the total electric load exceeds a specified load, while continuing to run the other implements. The grass mowing machine for high power applications requires a smaller and less costly engine and implement drives to perform high power applications without exceeding available power.

DESCRIPTION OF THE PREFERRED EMBODIMENT

Figure 1:
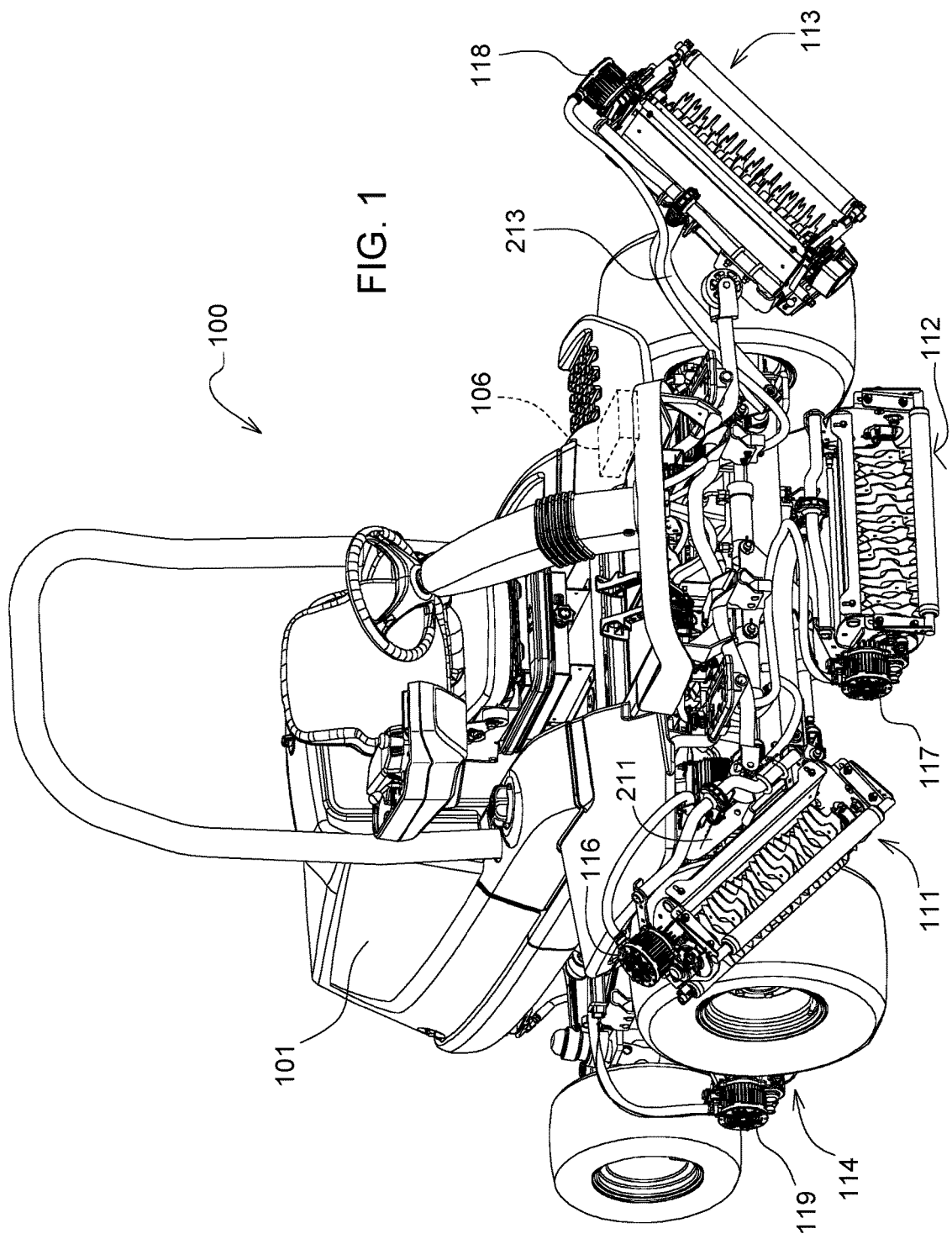
FIG. 1 is a perspective view of a grass mowing machine for high power applications during verticutting according to a first embodiment of the invention.
Figure 2:
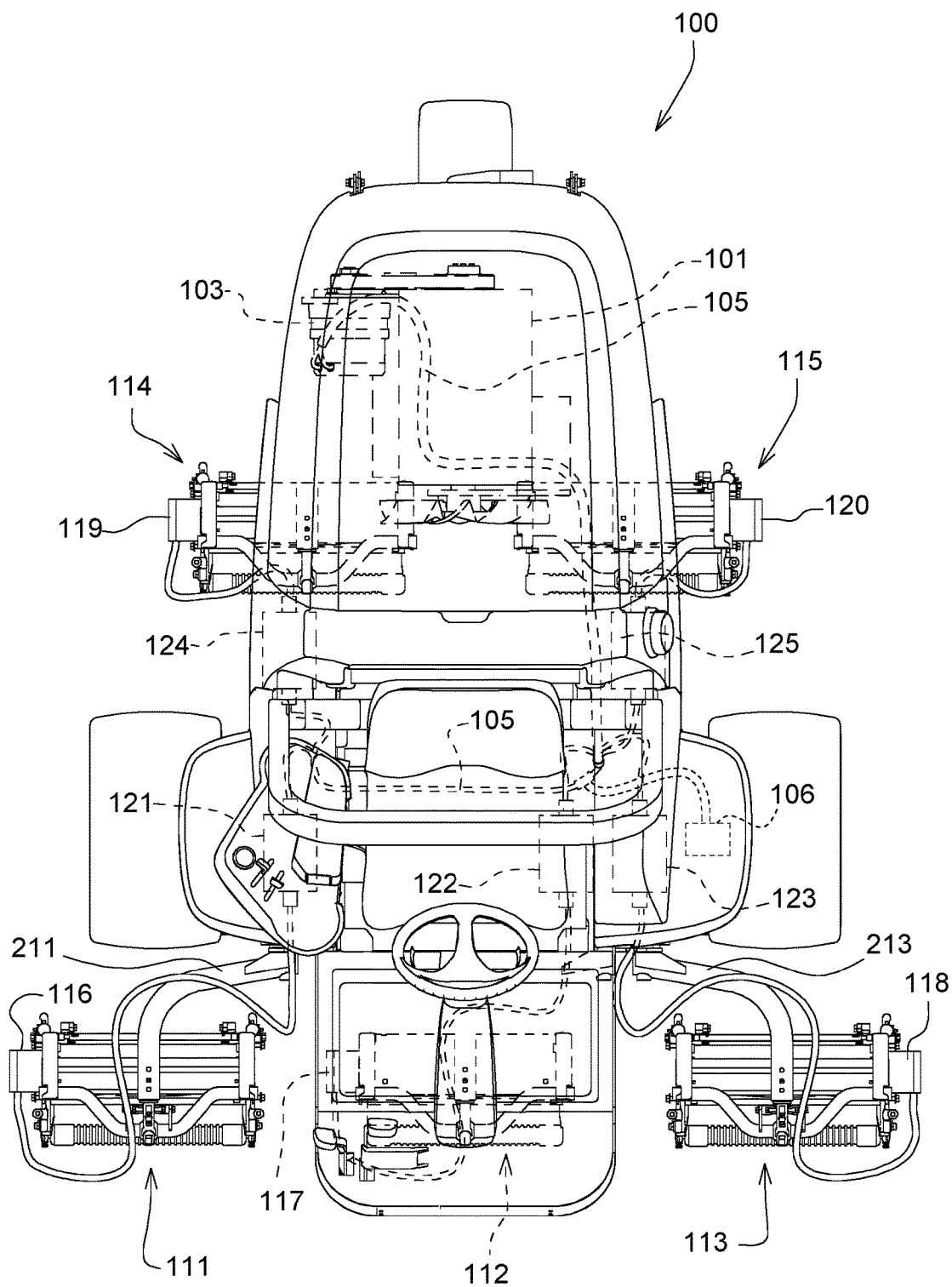
FIG. 2 is a top view of a grass mowing machine for high power applications according to a first embodiment of the invention.

As shown in FIGS. 1-2, the grass mowing machine for high power applications may be fairway mower 100 having internal combustion engine 101 or other power supply that turns an electrical power generating source, such as a belt-driven Lundell alternator 103. The grass mowing machine for high power applications also may have one or more batteries or other electrical power generating components. The alternator, battery, or other electrical power generating component may be electrically connected by electrical bus 105 to a plurality of electric motors 116-120, each electric motor provided with a motor controller 121-125 and rotating an implement such as a cutting reel or verticutting unit 111-115.

The grass mowing machine for high power applications is not limited to a fairway mower, but also may include other grass mowing machines having multiple implements. For example, the grass mowing machine may have five or seven implements. Internal combustion engine 101 may mechanically drive generator or alternator 103 directly through a belt and pulley arrangement. Alternatively, the internal combustion engine may indirectly drive a generator or alternator through a hydraulic motor. Or the alternator may charge a battery or other storage device that powers the electrically powered implements. The alternator may provide electric power to electric motors through motor controllers electrically coupled to the alternator.

In one embodiment of the grass mowing machine used for high power implements, electronic controller 106 may be electrically coupled to motor controllers 121-125. Electronic controller 106 may be a vehicle controller that is provided on-board the grass mowing machine, and may control the presence, absence or any other aspect of electrical energy to the motor controllers and electric motors for multiple electrically powered implements.

In one embodiment of the grass mowing machine for high power applications, after multiple electrically powered implements such as cutting reels or verticutting units are running in a normal operating mode, electronic controller 106 may monitor total implement load and determine if that load is consistently at or over the available power. For example, the electronic controller may determine the total electrically powered implement load is at or over the available power if bus voltage is below a specified preset voltage. In the case of a 48V or 56V alternator, the controller may determine the total implement load is at or over the available power if bus voltage is below a lower specified preset voltage such as 43 volts or 50 volts respectively. Similarly, the electronic controller may determine the total implement load is at or over the available power if bus current is above a specified preset current limit such as 270 amps. Alternatively, the electronic controller may monitor the regulator output from the alternator field voltage line. The regulator may switch the alternator field voltage line on and off depending on the bus voltage. The electronic controller may determine that the total implement load is at or over the available power if the regulator turns on the alternator field voltage line at close to or approaching 100%.

In one embodiment, if the total implement load is at or over the available power, the electronic controller may command at least one but not all motor controllers to shut off or disable the electric motor of at least one implement. Additionally, the controller may provide a signal to at least one but not all lift arms to raise an implement. For example, as shown in FIG. 1, lift arms 211 and 213 have raised and disabled cutting units 111 and 113, while the other lift arms and verticutting units continue to run in the lowered or operating position. The grass mowing machine may perform high power applications such as verticutting or scalping using not all of the implements, while one or more of the implements is raised and disabled. As a result, the grass mowing machine may perform high power applications such as verticutting with a smaller engine and implement drives. For example, less power is required to run three verticutting units instead of five, or five verticutting units instead of seven, while in each case there will be a slight compromise in productivity.

Figure 3:
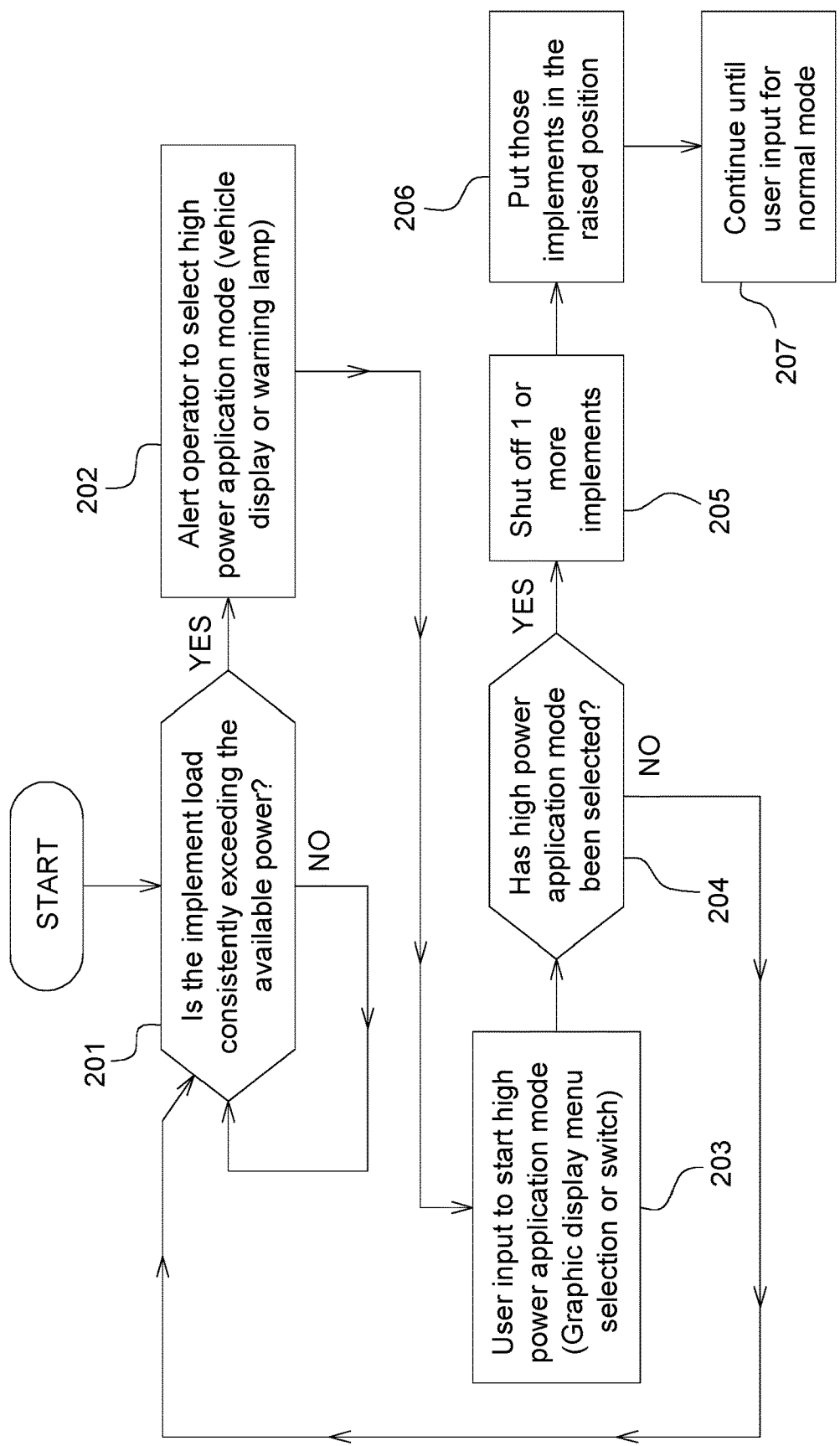
FIG. 3 is a block diagram of the logic for a grass mowing machine for high power applications according to a first embodiment of the invention.

FIG. 3 is a logic diagram for a first embodiment of the grass mowing machine used for high power applications. In block 201, the controller may monitor total implement load of multiple implements and determine if the load is consistently exceeding the available power. If the implement load consistently exceeds available power, in block 202 the controller may activate a vehicle display or warning indicator in the operator station to alert the operator. In block 203, the operator may start the high power application mode by actuating a switch or graphic display menu, for example. This high power application mode control or switch may be signal connected to the electronic controller. In block 204, the controller may determine if the operator has selected the high power application mode. If the high power application mode was not selected, the controller may return to block 201 and continue to monitor total implement load. If the high power application mode was selected, the controller may command one or more motor controllers to shut off or disable one or more but not all implements in block 205. For example, as shown in FIG. 1, the controller may command motor controllers 121, 123 to shut off or disable implements 111, 113, which may be two verticutting units positioned in the front row laterally outwardly. The grass mowing machine, however, may continue to provide electrical power to run the electric motors on the other three verticutting units. Additionally, in block 206, the controller may provide actuating signals to one or more of the lift arms, such as lift arms 211, 213, to raise the disabled implements to the transport or cross cut position, while the other implements may remain lowered in the operating or cutting position. In block 207, the machine may continue running in the high power application mode until the controller receives user input to return to the normal mode.

In a second embodiment, the electronic controller may monitor the total implement load, and then shut off or disable and raise one or more implements if the load consistently exceeds available power, without using a high power application mode switch. The controller may provide a signal on the vehicle display or warning indicator to alert the operator that the machine is operating in the high power application mode.

In a third embodiment, the operator may select the high power application before starting and operating the implements. In response to the operator's selection of the high power application mode, the electronic controller may provide electric power to one or more implements, but not all the implements. The electronic controller also may actuate raise/lower arms to bring one or more but not all implements up to the raised position. The selected implements that are shut off or disabled and raised may be the two implements positioned furthest laterally out from the machine.

Having described a preferred embodiment, it will become apparent that various modifications can be made without departing from the scope of the invention as defined in the accompanying claims.

The invention claimed is:

1. A grass mowing machine for high power applications, comprising:
   a controller on the grass mowing machine connected to a plurality of electric motor controllers for a plurality of electric motors rotating a plurality of implements;
   the controller sensing a total electrical load of the implements during verticutting or scalping applications that require higher power than a normal mowing application; and raising and disabling at least one but not all of the implements if the total electric load exceeds a specified load while continuing to run the other implements.

2. The grass mowing machine for high power applications of claim 1 wherein the controller raises and disables an implement on each end of a first row of implements if the total electric load exceeds a specified load.

3. The grass mowing machine for high power applications of claim 1 further comprising an operator switch for a high power application mode in which the controller responds to the switch by raising and disabling at least one but not all of the implements.

4. The grass mowing machine for high power applications of claim 1 wherein the controller provides a signal to an operator station on the grass mowing machine indicating if the total electrical load of the implements exceeds the available power.

5. The grass mowing machine for high power applications of claim 1 wherein the implements are verticutting units.

6. The grass mowing machine for high power applications of claim 1 wherein the controller provides a signal to an operator station on the grass mowing machine if the total electric load on the implements exceeds a specified load.

7. The grass mowing machine for high power applications of claim 1 wherein the controller disables the electric motor of an implement on each end of a row of implements and raises the implement on each end of the row.

* * * * *